US010643062B2

(12) United States Patent
Polimeno et al.

(10) Patent No.: US 10,643,062 B2
(45) Date of Patent: May 5, 2020

(54) FACIAL RECOGNITION PET IDENTIFYING SYSTEM

(71) Applicant: Finding Rover, Inc., Pleasanton, CA (US)

(72) Inventors: John Polimeno, Byron, CA (US); Jason John Polimeno, Brentwood, CA (US); Steven P. Callahan, Centerville, UT (US); John M. Schreiner, Salt Lake City, UT (US); Rick S. Chang, Dublin, CA (US)

(73) Assignee: Finding Rover, Inc., Brentwood, CA (US)

( * ) Notice: Subject to any disclaimer, the term of this patent is extended or adjusted under 35 U.S.C. 154(b) by 0 days.

(21) Appl. No.: 16/559,624

(22) Filed: Sep. 3, 2019

(65) Prior Publication Data

US 2019/0392200 A1 Dec. 26, 2019

Related U.S. Application Data

(63) Continuation of application No. 16/287,972, filed on Feb. 27, 2019, now Pat. No. 10,438,051, which is a
(Continued)

(51) Int. Cl.
*G06K 9/00* (2006.01)
*G06Q 10/10* (2012.01)
(Continued)

(52) U.S. Cl.
CPC ....... *G06K 9/00281* (2013.01); *G06F 3/0484* (2013.01); *G06F 16/9535* (2019.01);
(Continued)

(58) Field of Classification Search
CPC ........... G06K 9/00221; G06K 9/00281; G06K 9/00926; G06Q 30/02; G06Q 30/0239;
(Continued)

(56) References Cited

U.S. PATENT DOCUMENTS

| 4,993,068 | A | * | 2/1991 | Piosenka | G06F 21/32 |
| | | | | | 235/380 |
| 5,719,951 | A | * | 2/1998 | Shackleton | G06K 9/00221 |
| | | | | | 375/E7.026 |

(Continued)

OTHER PUBLICATIONS

Pet FBI (www.netlbi.org website pages printed through http://web.archive.org. All citations are at least 1 year old from the filing date (Dec. 1, 2011) of instant invention. Total pp. 1-16—as marked in bold by examiner at the bottom of each page (Year: 2009).*

(Continued)

*Primary Examiner* — Manav Seth
(74) *Attorney, Agent, or Firm* — Imperium Patent Works LLP; Mark D. Marrello

(57) ABSTRACT

A server system stores a database of records. Each record stores a digital image of a pet, facial recognition markers, and owner identification information. An owner may register his/her pet using a cellular telephone and a mobile app. The owner is prompted to supply a digital photograph of the pet and to enter eye and nose location information. The system generates therefrom facial recognition markers and stores the markers in a record. If a lost pet is found, a finding user can use a cellular telephone to take a picture of the animal and to enter eye and nose location information. The system generates markers and compares the markers in a facial recognition process to other stored markers to identify records of animals that resemble the lost pet. If the record of the lost pet is identified, then owner identification information in the record is used to contact the owner.

20 Claims, 7 Drawing Sheets

"FINDING ROVER" APP
(AS DISPLAYED ON THE SCREEN OF THE CELL PHONE OF THE USER WHO FOUND THE ANIMAL)

Related U.S. Application Data continuation of application No. 15/139,341, filed on Apr. 27, 2016, now Pat. No. 10,268,877, which is a continuation of application No. 13/610,877, filed on Sep. 12, 2012, now Pat. No. 9,342,735.

(60) Provisional application No. 61/565,962, filed on Dec. 1, 2011.

(51) Int. Cl.
  *G06F 16/9535* (2019.01)
  *G06Q 30/02* (2012.01)
  *G06F 3/0484* (2013.01)

(52) U.S. Cl.
  CPC ..... *G06K 9/00221* (2013.01); *G06K 9/00926* (2013.01); *G06Q 10/1093* (2013.01); *G06Q 30/0241* (2013.01)

(58) Field of Classification Search
  CPC .. G06Q 10/087; G06Q 30/0217; G06Q 50/01; G06Q 10/08; G06Q 10/10; G06Q 30/0255; G06Q 10/02; G06Q 10/06316; G06Q 10/107; G06Q 20/08; G06Q 20/085; G06Q 20/16; G06Q 20/3224; G06Q 20/382; G06Q 30/00; G06Q 30/0185; G06Q 30/0201; G06Q 30/0207; G06Q 30/0208; G06Q 30/0214; G06Q 30/0218; G06Q 30/0225; G06Q 30/0241; G06Q 30/0261; G06Q 30/0267; G06Q 30/0277; G06Q 30/0625; G06Q 30/0633; G06Q 50/10; G06Q 10/1093; G06F 17/30; G06F 17/30876; G06F 17/278; G06F 17/28; G06F 17/30014; G06F 17/30253; G06F 17/30545; G06F 17/30707; G06F 17/30734; G06F 17/3084; G06F 17/30864; G06F 17/30882; G06F 21/31; G06F 21/35; G06F 21/44; G06F 21/60; G06F 2221/2111; G06F 3/01; G06F 3/0362; G06F 3/0484; G06F 3/04847; G06F 8/61; G06F 8/65; G06F 9/00; G06F 9/44; G06F 19/9535

See application file for complete search history.

(56) References Cited

U.S. PATENT DOCUMENTS

| | | | | |
|---|---|---|---|---|
| 6,035,055 A * | 3/2000 | Wang | ............ | G06F 16/5838 382/118 |
| 6,044,168 A * | 3/2000 | Tuceryan | ............ | G06K 9/00221 345/582 |
| 6,081,607 A * | 6/2000 | Mori | ............ | A01K 11/006 340/5.8 |
| 6,724,919 B1 * | 4/2004 | Akiyama | ............ | G06F 21/32 340/5.52 |
| 6,845,382 B2 | 1/2005 | Meadows | ............ | 707/104.1 |
| 6,975,222 B2 * | 12/2005 | Krishan | ............ | G08B 13/14 340/539.1 |
| 7,133,537 B1 * | 11/2006 | Reid | ............ | G06T 7/254 382/103 |
| 7,218,760 B2 * | 5/2007 | Gu | ............ | G06K 9/00281 382/118 |
| 7,286,929 B2 * | 10/2007 | Staton | ............ | B60R 25/00 701/467 |
| 7,676,534 B2 * | 3/2010 | Murakami | ............ | G09B 29/102 708/442 |
| 7,706,815 B2 * | 4/2010 | Graham | ............ | G06Q 30/02 455/456.6 |
| 7,817,824 B2 * | 10/2010 | Liang | ............ | A61B 5/1113 382/110 |
| 7,848,765 B2 * | 12/2010 | Phillips | ............ | G08B 21/0236 455/456.3 |
| 7,899,208 B2 * | 3/2011 | Kondo | ............ | G06K 9/32 348/135 |
| 7,941,160 B2 * | 5/2011 | Werner | ............ | A63B 24/0062 455/440 |
| 8,224,029 B2 | 7/2012 | Saptharishi et al. | ............ | 382/103 |
| 8,253,770 B2 * | 8/2012 | Kurtz | ............ | H04N 7/142 348/14.01 |
| 8,260,775 B2 * | 9/2012 | Ahn | ............ | G06F 16/2428 707/724 |
| 8,306,265 B2 * | 11/2012 | Fry | ............ | A61B 5/0452 348/143 |
| 8,310,361 B1 * | 11/2012 | Stout | ............ | G06F 16/29 340/539.11 |
| 8,311,848 B2 * | 11/2012 | Subash | ............ | G06Q 10/10 705/2 |
| 8,384,798 B2 * | 2/2013 | Niyagawa | ............ | H04N 5/76 348/222.1 |
| 8,532,342 B2 * | 9/2013 | Nielsen | ............ | G06Q 10/06 382/113 |
| 8,571,259 B2 * | 10/2013 | Margolis | ............ | G06K 9/00979 348/61 |
| 8,595,257 B1 * | 11/2013 | Ovide | ............ | G06Q 50/01 707/784 |
| 8,675,912 B2 * | 3/2014 | Caduff | ............ | G06F 3/011 382/103 |
| 8,698,920 B2 * | 4/2014 | Uemura | ............ | H04N 5/23219 348/222.1 |
| 8,873,800 B2 * | 10/2014 | Zhou | ............ | G06K 9/00375 348/143 |
| 9,015,759 B2 * | 4/2015 | Elend | ............ | H04N 21/4516 725/43 |
| 9,342,735 B2 * | 5/2016 | Polimeno | ............ | G06K 9/00281 |
| 10,268,877 B2 * | 4/2019 | Polimeno | ............ | G06K 9/00221 |
| 10,430,643 B2 * | 10/2019 | Polimeno | ............ | G06K 9/00221 |
| 10,438,051 B1 * | 10/2019 | Polimeno | ............ | G06F 16/9535 |
| 2003/0024482 A1 * | 2/2003 | Gondhalekar | ............ | A01K 1/031 119/417 |
| 2003/0099409 A1 * | 5/2003 | Rowe | ............ | G06T 11/60 382/285 |
| 2003/0100998 A2 * | 5/2003 | Brunner | ............ | A01K 1/031 |
| 2003/0229452 A1 * | 12/2003 | Lewis | ............ | G06Q 50/24 702/19 |
| 2004/0020443 A1 * | 2/2004 | Ohl | ............ | A01K 1/031 119/417 |
| 2004/0141636 A1 * | 7/2004 | Liang | ............ | A61B 5/1113 382/110 |
| 2006/0201447 A1 * | 9/2006 | Meadows | ............ | A01K 29/00 119/720 |
| 2007/0036395 A1 | 2/2007 | Okun | ............ | 382/115 |
| 2008/0201327 A1 * | 8/2008 | Seth | ............ | G06F 16/5854 |
| 2008/0235111 A1 * | 9/2008 | Dotan | ............ | G06F 16/9535 705/26.1 |
| 2008/0297366 A1 * | 12/2008 | Hsieh | ............ | H04N 1/2158 340/686.1 |
| 2008/0306921 A1 * | 12/2008 | Rothmuller | ............ | G06F 16/958 |
| 2009/0012953 A1 * | 1/2009 | Chu | ............ | G01C 21/3679 |
| 2009/0037477 A1 * | 2/2009 | Choi | ............ | G06F 16/5854 |
| 2009/0100018 A1 * | 4/2009 | Roberts | ............ | G06F 16/29 |
| 2009/0102859 A1 | 4/2009 | Athsani et al. | ............ | 345/619 |
| 2009/0160939 A1 | 6/2009 | Fernandez et al. | ............ | 348/158 |
| 2009/0202101 A1 * | 8/2009 | Nielsen | ............ | G06Q 10/06 382/100 |
| 2009/0279789 A1 * | 11/2009 | Malik | ............ | G06K 9/00979 382/209 |
| 2010/0106615 A1 * | 4/2010 | Chadwick | ............ | G06Q 10/06 705/26.1 |
| 2010/0215278 A1 * | 8/2010 | Skvorc, II | ............ | A01K 11/008 382/218 |
| 2010/0222027 A1 * | 9/2010 | Scott | ............ | G06Q 30/02 455/412.2 |
| 2010/0241658 A1 * | 9/2010 | Rathurs | ............ | G06F 21/60 707/769 |

(56) References Cited

U.S. PATENT DOCUMENTS

| | | | |
|---|---|---|---|
| 2011/0026781 A1 | 2/2011 | Osadchy et al. ............... | 382/118 |
| 2011/0153186 A1* | 6/2011 | Jakobson ............... | G01C 21/20 |
| | | | 701/532 |
| 2012/0098999 A1 | 4/2012 | Chen ........................ | 348/231.5 |
| 2012/0188370 A1 | 7/2012 | Bordonaro .................... | 348/143 |
| 2014/0050372 A1* | 2/2014 | Qi ....................... | G06K 9/00221 |
| | | | 382/118 |
| 2015/0131872 A1* | 5/2015 | Ganong ............. | G06K 9/00677 |
| | | | 382/118 |

OTHER PUBLICATIONS iTunes (Aug. 2012). "Lost Pet Sighting". pp. 1-2. Retrieved from http://itunes.apple.com/us/app/lost-pettracker/id407838959?mt=8 &ls=1http://www.freshapps.com/communityleash/.

Fresh Apps (Aug. 2012). "Community Leash". pp. 1-8. Retrieved from http://www.freshapps.com/community-leash/.

DogLost (Aug. 2012). "DogLost Goes Mobile—For Free". pp. 1-2. Retrieved from http://www.doglost.co.uk/dogtracker_app_launch.php.

iTunes (Oct. 2009). "iPet Alert". pp. 1-3. Retrieved from http://itunes.apple.com/app/ipet-alert/id307758878?mt=8.

mobiPET. "The world's first amber alert program for pets". Retrieved from https://mobipet.mobiworld.me//mobiPET.pdf.

mobiPET. "Frequently Asked Questions". pp. 1-3. Retrieved from https://mobipet.mobiworld.me//FAQ.php#.UD7YVN38uSo.

\* cited by examiner

BUILDING A DATABASE OF RECORDS OF PET INFORMATION

300

| ENTER JPEG OF YOUR PET HERE | OWNER NAME: _____<br>OWNER ADDRESS: _____<br>OWNER CONTACT INFORMATION: _____<br>PET NAME: _____<br>NICKNAME: _____<br>PET BREED: _____<br>PET SEX: _____<br>PET WEIGHT: _____<br>PET COLOR: _____<br>PET BIRTHDAY: _____<br>DISTINCTIVE MARKINGS: _____<br>GEOG. LOCATION OF ANIMAL: _____ |

REGISTRATION SCREEN
(AS DISPLAYED TO AN OWNER OF A PET WHO IS
REGISTERING A PET WITH THE FR SERVER SYSTEM)

FIG. 3

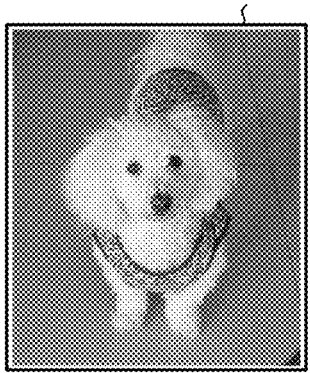

"FINDING ROVER" APP
(AS DISPLAYED ON THE SCREEN OF THE CELL
PHONE OF THE USER WHO FOUND THE ANIMAL)

FIG. 4

"FINDING ROVER" SYSTEM

FACIAL RECOGNITION PET IDENTIFYING SYSTEM

CROSS-REFERENCE TO RELATED APPLICATION

This application is a continuation of, and claims priority under 35 U.S.C. § 120 from, nonprovisional U.S. patent application Ser. No. 16/287,972 entitled "FACIAL RECOGNITION LOST PET IDENTIFYING SYSTEM," filed on Feb. 27, 2019, the subject matter of which is incorporated herein by reference. Application Ser. No. 16/287,972, in turn, is a continuation of, and claims priority under 35 U.S.C. § 120 from, nonprovisional U.S. patent application Ser. No. 15/139,341 entitled "FACIAL RECOGNITION LOST PET IDENTIFYING SYSTEM," filed on Apr. 27, 2016, and issued as U.S. Pat. No. 10,268,877, the subject matter of which is incorporated herein by reference. application Ser. No. 15/139,341, in turn, is a continuation of, and claims priority under 35 U.S.C. § 120 from, nonprovisional U.S. patent application Ser. No. 13/610,877 entitled "FACIAL RECOGNITION LOST PET IDENTIFYING SYSTEM," filed on Sep. 12, 2012, and issued as U.S. Pat. No. 9,342,735, the subject matter of which is incorporated herein by reference. The Ser. No. 13/610,877 application, in turn, claims the benefit under 35 U.S.C. § 119 of provisional application Ser. No. 61/565,962, entitled "Facial Recognition Lost Pet Identifying System", filed Dec. 1, 2011, the subject matter of which is incorporated herein by reference.

TECHNICAL FIELD

The described embodiments relate generally to systems for identifying lost pets and reuniting them with their owners.

BACKGROUND INFORMATION

There are currently approximately seventy-eight million pet dogs in the United States. An estimated ten million of these pets go missing each year. Previously existing internet-based lost pet locating systems have various shortcomings and have not been widely adopted. Sadly, only a very small percentage of the ten million missing dogs (ten to fifteen percent) are found and returned to their owners.

SUMMARY

An internet-based pet finding system (referred to here as the "Finding Rover System" or simply the "FR system") employs computer-implemented facial recognition and includes a server system. The server system maintains an FR database of records, where each record corresponds to an animal (for example, a pet dog). Each record is identified by a unique identifier (ID). In addition, each record stores other information including owner identification information pertaining to the owner of the pet, information about the animal, and other information. If a person found the animal, then the record may store identification information pertaining to that person. The owner identification information includes information sufficient to contact the owner of the pet should the pet become lost.

A pet can be registered with the FR system by the pet's owner, by a person who found the pet, or by another third party. In a typical case, a pet owner registers his/her own pet by interacting with web pages served by the server system or by interacting with a mobile application with web data from the server system. The web pages or the mobile application prompt the owner to supply a digital photograph of the pet, and to enter certain owner identification information. The owner is prompted to enter information about where in the submitted digital photograph the pet's eyes and nose are located. The FR system then processes the digital image using the user-indicated eye location information and the user-indicated nose location information, thereby generating facial recognition markers. In one example, the facial recognition markers are pixel data in the form of a byte string. The facial recognition markers and the owner identification information, as well as other information as mentioned above, is then stored in a record associated with the pet. The record is assigned a unique ID. The ID is thereafter usable to identify the record in the FR database. There are many such records in the FR database.

In one example, the owner interacts with the FR system to carry out the pet registration process using a wireless mobile communication device such as an iPhone cellular telephone having a digital camera functionality. The owner first downloads a mobile app for the FR system. The mobile app may be downloaded from the FR server system, or from another internet accessible source such as the Apple App Store. The mobile app is installed on the owner's wireless mobile communication device and, in combination with the server system, leads the owner through the pet registration process such that the record for the pet is created and is stored in the FR database. In this way, many pets are registered. Each pet has one corresponding record in the FR database.

If a person having a suitable wireless mobile communication device thereafter finds an animal believed to be a lost pet, the person can use the wireless mobile communication device to take a digital photograph of the animal. The finding user is prompted to enter eye location information and nose location information. The digital photograph, along with the user-indicated eye location information and user-indicated nose location information and other information such as the GPS geographical location where the pet was found, is then communicated under control of the FR mobile app from the finding user's wireless mobile communication device to the server system. The server system converts the digital image into facial recognition markers using the same process used by owners to register their pets. The server system then uses a computer-implemented facial recognition process to search the FR database to find those records whose stored digital images most closely match the digital image of the found pet. To do this, the GPS geographical location information indicating where the pet was found may be used to search only those records whose pets are indicated to reside within a predetermined radius of the location where the pet was found. The markers in this subset of records are then compared to the markers for the found pet. The records having markers that most closely match the markers of the found pet are identified, and are ranked. A digital photograph stored in each of these records is displayed on the wireless mobile communication device of the finding user. The FR system queries the finding user to use the wireless mobile communication device to indicate whether one of the pictured animals is the animal the finding user has found. The finding user looks through the photographs, and selects the photograph of the animal that was found. The owner identification information stored in the record for the selected photograph is then usable to communicate with the owner and to inform the owner that his/her missing pet has been found. The FR system can carry out this communication to the owner without the finding user learning the owner identification information. The degree to which owner identification information is viewable by a finding user is presettable by the owner at pet registration time. The record stores information indicating how the owner is to be located if the registered pet were to be found.

In some operational examples, an owner registers a pet, and then the pet is lost, and then a finding user uses the FR system to identify the record for the pet and to contact the owner. In other operational examples, a pet is found and the finding user submits a digital photograph of the found pet to the FR system before the owner has registered the pet or even used the FR system. The owner then registers the pet with the FR system using an old photograph. At this time, the FR system performs the facial recognition process and finds the record of the pet (registered by the finding user) and informs the owner that the pet has been found. The owner is then put in contact with the finding user using finding user identification information that was stored in the record for the found pet. Animals can be registered by their owners, by finding users, or by others. Each animal, however, has only one record in the database. If the system determines that two records correspond to the same pet, then the FR system merges the two records so that there remains only one record for the pet.

A mobile app executing on a wireless mobile communication device is the principal way that a user interacts with the FR system to register an animal and to locate lost animals. Users, however, may also interact with the FR system using other web-enabled computing devices that are capable of accessing web pages served by the FR system. Animals can, for example, be registered using an ordinary desktop computer that is connected to the internet and has an ordinary web browser. Digital images of animals used by the FR system need not be taken using the same device used to communicate with the system, but rather may be taken using another device such as a digital camera.

In one novel aspect, information in the FR database about an individual dog that was put into the FR database for lost pet locating purposes is thereafter used by the FR system to provide the registered owner with information particularly pertinent to the particular dog. For example, an owner of a registered dog can, in entering a retail store (for example, a pet store), use the mobile app on the owner's cellular telephone to indicate a desire to receive coupons and/or other information specific to the store. The FR system then provides such electronic coupons usable in the particular retail store and/or the FR system provides information about sale prices or products available for purchase in the particular retail store. The coupons and information can be made specific to the individual dog by using information stored in the record about the breed, age, size, sex, etc. of the particular dog.

In one novel aspect, veterinarians are enlisted and incentivized to register pets passing through their offices with the FR system. In return for a veterinarian registering pets passing through his/her office with the FR system, the FR system is configurable by the veterinarian to send out electronic reminders and notices automatically. The reminders and notices for a pet are sent to the pet owner using the owner identification information stored in the record for the pet. The veterinarian can specify, through a special veterinarian's portal having appropriate security features, what the reminders and notices will say and when the reminders and notices will be sent out.

Further details and embodiments and techniques are described in the detailed description below. This summary does not purport to define the invention. The invention is defined by the claims

BRIEF DESCRIPTION OF THE DRAWINGS

The accompanying drawings, where like numerals indicate like components, illustrate embodiments of the invention.

FIG. 3 is a diagram of a registration screen that an owner uses to register a pet with the FR system.

FIG. 4 is a diagram of information displayed on the cellular telephone of a finding user after the FR system has identified a matching record.

FIGS. 6A, 6B, and 6C together form complete FIG. 6.

DETAILED DESCRIPTION

Reference will now be made in detail to some embodiments of the invention, examples of which are illustrated in the accompanying drawings.

Figure 1:
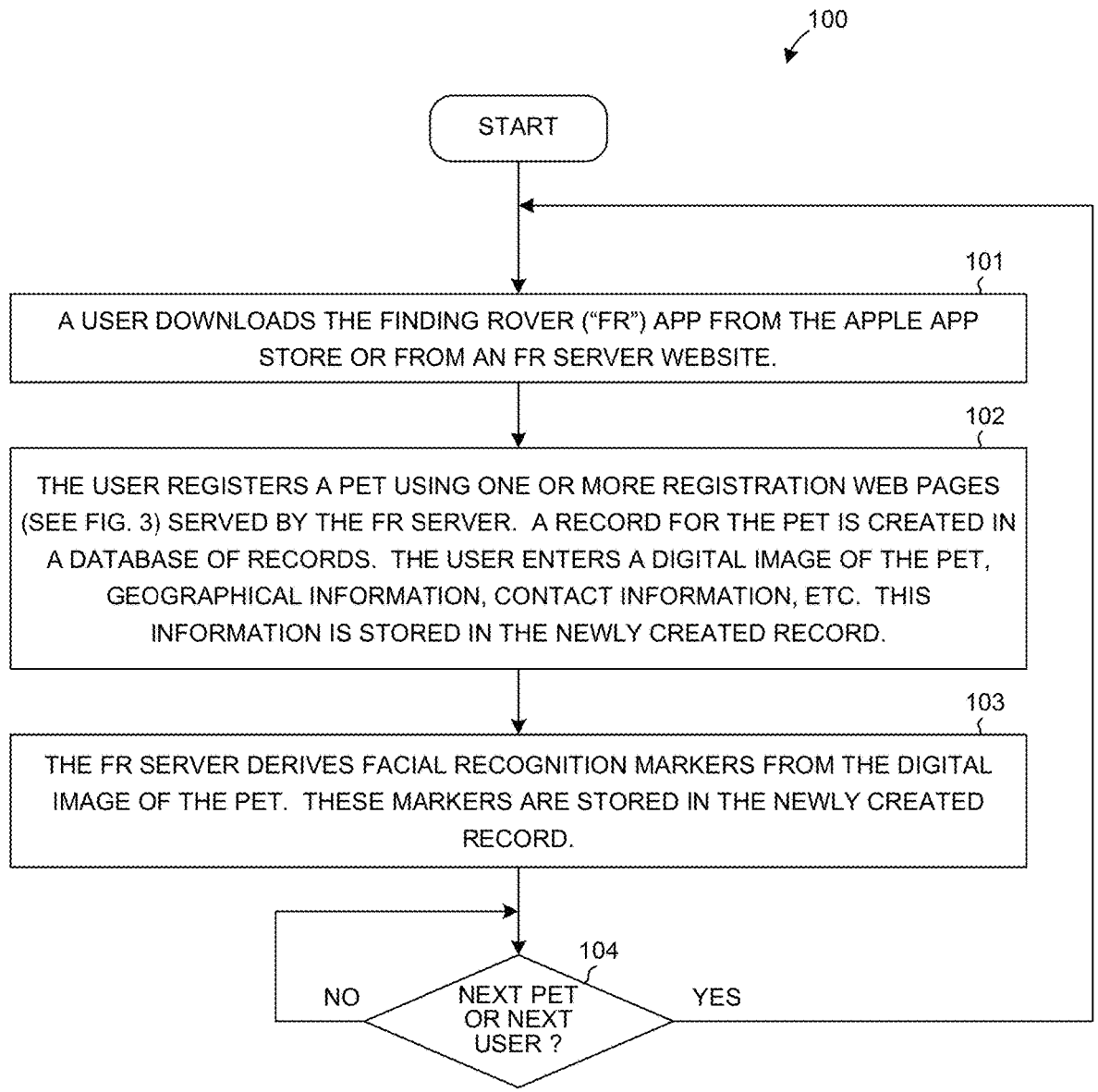
FIG. 1 is flowchart of a method 100 of building a database of records, where each record includes information about a different pet including facial recognition markers and including owner identification information.

FIG. 1 is a flowchart of a method 100 of using a system (called the "Finding Rover" system, hereinafter the "FR system") to build a database of records of pet information. In a first step (step 101), a user uses a wireless mobile communication device to download a mobile application referred to here as the "FR app". In one example, the mobile application is a so-called "mobile app" for execution on a cellular telephone such as an iPhone available from Apple Computer of Cupertino, Calif. In the specific example described below, the user's wireless mobile communication device is an iPhone. Using the iPhone, the user accesses an internet repository of mobile apps. In the present example involving the iPhone, the user uses the iPhone to access the Apple App Store website via the internet. Alternatively, the mobile app may be downloaded from the FR server system of the FR system. An icon of the FR app is displayed on the touch screen of the iPhone. The user then selects the FR app icon using the touchscreen of the iPhone. As a result, the FR app is downloaded from the Apple App Store or from the FR server system into the user's iPhone cellular telephone via the internet. Established and well-known procedures for supplying apps to users of iPhones are used.

Next (step 102), the user registers a pet (i.e., an animal) using one or more registration web pages served by the FR server system or using the FR mobile app with web data provided by the FR server system. The FR server system is operated by a pet finding entity. The registration screens (whether web pages or mobile app screens) are displayed to the user. FIG. 3 is a diagram of an example of a registration screen 300 as the registration screen is seen on the screen of the user's iPhone.

In response to prompts on the registration screens, the user enters information (step 102) such as the user's name, the user's address, contact information for the owner of the pet (for example, an email address and/or a telephone number), the name of the pet, the breed of the pet, the sex of the pet, the weight of the pet, the color of pelt of the pet, the age or birthday of the pet, distinctive markings on the pet, the geographical location where the pet lives, and other identifying information about the pet and about the owner of the pet. In addition, the user is prompted by the registration screens to upload one or more digital photographs (for example, JPEG files) of the pet to the FR server system. The user complies. In one example, the FR app prompts the user to use a camera of the iPhone to take a digital image of the owner's pet, and the resulting digital image file is then automatically communicated to the FR server system. Accordingly, a new record associated with the pet being registered is created in an FR database on the FR server system, and all the collected information is stored in this record on the FR server system.

The FR database preferably contains many such records, where each record is for a different pet, and where each record includes: 1) identifying information about the pet, 2) one or more digital images of the pet, and 3) information about the owner of the pet.

The FR server system uses a computer-implemented facial recognition process to analyze the digital image (step 103) of the pet and to derive from the digital image a set of facial recognition markers that are indicative of the pet. In one example, the facial recognition markers for a pet are in the form of a byte string. The byte string has an associated identifier (ID). The ID is usable to identify the record in the FR database. The byte string of derived markers is stored in the record along with the ID and other identifying information about the pet and about the pet owner. At the conclusion of the registration process, the FR app is left installed on the user's cellular telephone and a record for the user's pet is present in the database on the FR server system.

This process is repeated (step 104) so that the FR database on the FR server system includes records for many pets. Although an example is described above where a cellular telephone is used as the vehicle for entering information into the FR server system to build a record for the pet, in other examples the user may use another internet-connected device such as a personal computer to register a pet. Although an example is described above where the person who performs the registration process and registers a pet is the pet's owner, in other examples a person or entity other than the owner performs the registration process and registers the pet. For example, an owner's pet may be registered by a veterinarian or an employee of the veterinarian. This registration may occur when the pet is present at the veterinarian's office or is otherwise being processed by the veterinarian's office. An owner's pet may also be registered by a retail store owner or an employee of a retail store. An owner's pet may be registered at an animal shelter by an employee or other worker at the shelter. All the user registration information solicited by screen 300 of FIG. 3 need not be entered.

Figure 2:
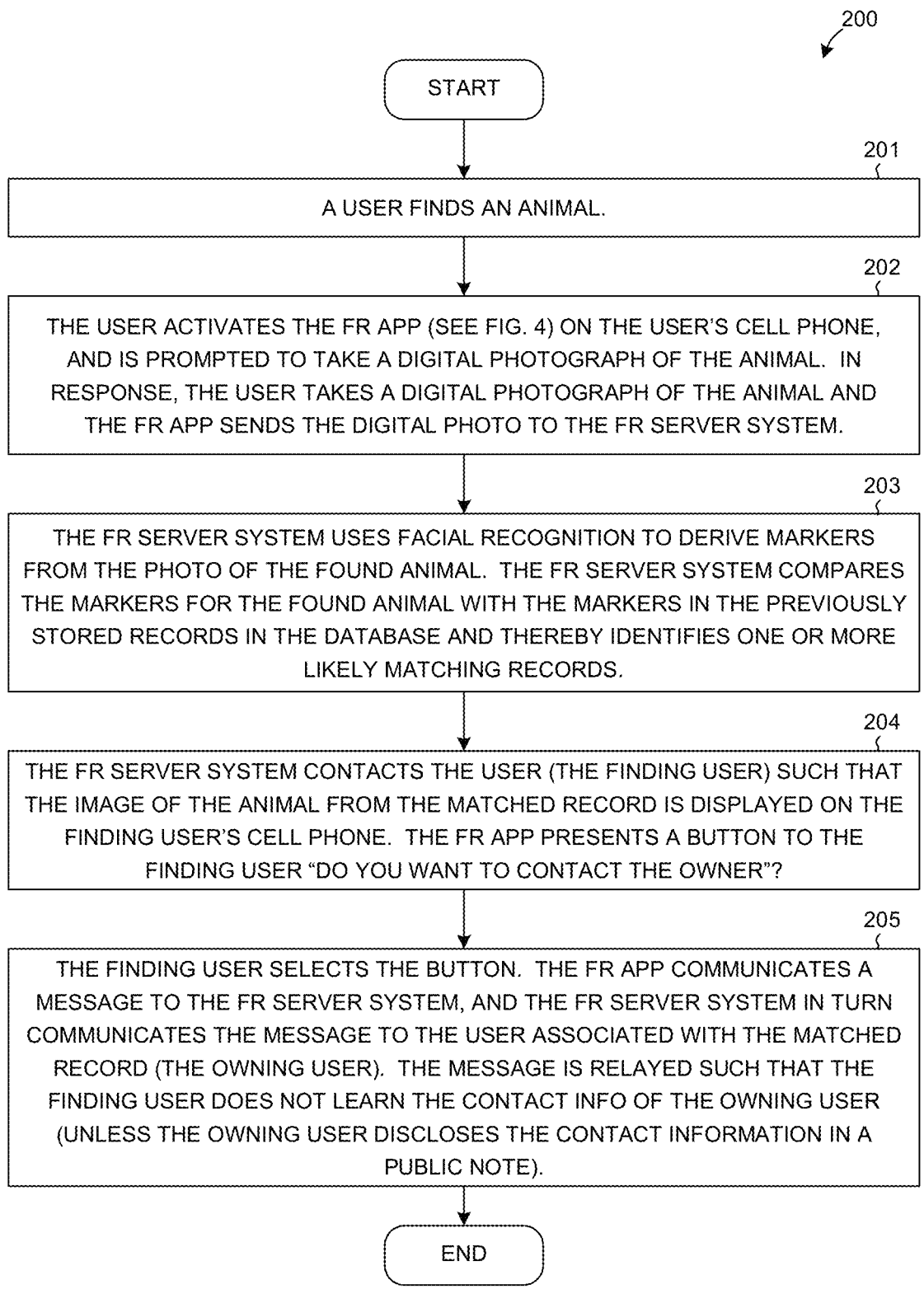
FIG. 2 is a flowchart of a method 200 of identifying a lost pet and contacting the pet's owner.

FIG. 2 is a flowchart of a method 200 of using the FR system to identify a lost pet and to contact the owner of the lost pet. In the illustrated example, a user of the FR system finds an animal that appears to be a lost pet (step 201).

The user activates (step 202) the FR app on the user's cellular telephone and is prompted by the FR app to use the finder's cellular telephone to take a digital photograph (also referred to here as a "digital image") of the animal. In response, the user takes the requested digital photograph using the cellular telephone. The user may also be prompted by the FR app to identify the left eye, right eye, and the nose. The user may then be prompted to enter other apparent identifying information about the animal such as the animal's breed, weight, size, color, apparent age, distinctive markings, etc. The FR app then causes the digital image of the found animal along with the other collected information to be sent by wireless communication from the finder's cellular telephone to the FR server system. The wireless communication is not a voice call or email communication, but rather is an automatic TCP/IP data communication that does not involve person-to-person communication. The FR app may also communicate geographical location information indicative of the location where the animal was found. For the example, the FR app may cause GPS information indicative of the location of the cellular telephone to be automatically communicated along with the digital image to the FR server system. If the finder's cellular telephone does not have a GPS capability, then the user may be prompted to enter geographical location information (for example, cross street) manually indicating where the animal was found or where to animal is located.

Next, the FR server system uses a computer-implemented facial recognition process (step 203) to derive facial recognition markers from the digital image of the found animal. In one example, the very same computer-implemented facial recognition process used in the registration process to generate a byte string from the digital image submitted during registration is used so that a byte string is generated from the digital image submitted in step 202. The byte string generated from the digital image submitted in step 202 may have the same number of bytes as does each of the other bytes strings stored in the database on the FR server system. The FR server system then compares the derived markers for the found animal (and the other collected information about the found animal including where the animal was found) to markers and other information stored in other records in the database. This comparing/searching step is described in further detail below. There are several different suitable ways this comparing/searching step can be carried out. As a result of this comparison of markers, one or more records from the database are identified. These identified records are the records whose markers and other information are the best matches for the markers and other information of the found animal.

In one example, records for pets that are indicated by the FR database to be resident (as determined by information in their respective records) within a certain radius of the geographical location where the animal was reported found are compared/searched first. In one example, the geographical location information received in step 202 along with the digital image is used to select a subset of the records in the database, where the location information in each subset record indicates the pet is resident within the certain predetermined radius of the geographical location of the mobile communication device used to take the digital image of the found animal. The amount of time required to perform the comparing/searching step is reduced by reducing the number records that are compared/searched.

Once the FR server system has identified one or more likely matching records, the FR server system then forwards certain information from the identified records (step 204) to the cellular telephone of the user who found the animal. In one example, a digital photograph of the pet from each of the identified likely matches is displayed on the display of the finding user's cellular telephone. For each such digital photograph, a user-selectable button is also displayed on the touchscreen of the cellular telephone along with a query. The query asks the finding user to confirm that the animal the user has found is the animal in the digital photograph. In one example, this query is presented in the form of a button on the touchscreen of the finding user's iPhone. In one example, the FR system is provisioned such that less than ten seconds elapse between the time when the finding user causes the photograph of the found animal to be sent from the finding user's iPhone to the FR system and the time when the photographs of likely matches are displayed to the finding user on the screen of the finding user's iPhone.

In one example, if the finding user selects the button by a picture of an animal, then the finding user is confirming both: 1) that the animal in the corresponding picture is the found animal, and 2) that the finding user wants the registered owner of the displayed animal to be contacted. FIG. 4 is a diagram of information 301 displayed on the display of the cellular telephone of the finding user in one example. As indicated in FIG. 4, certain sensitive information about the identity of the owner of the registered pet is, however, not made available to the finding user. Which information is made available to the finding user, and which information is not made available to the finding user, is specified by the owner user in the earlier registration process. Button 302 displayed on the screen of FIG. 4 is a button that the finding user can select to indicate that the animal in picture 303 is the same animal that the user found. For each such likely-match photograph presented to the finding user, there is a similar button.

If the finding user believes that the found animal is the animal in picture 303, then the finding user selects the associated button 302. As a result, in one example, the FR app executing on the finding user's cellular telephone causes a message to be sent in the form of a TCP/IP wireless communication (step 205) from the finding user's cellular telephone to the FR server system. This in turn causes the FR server system to send a message from the FR server system to the owner of the displayed animal using the contact information stored in the identified record. In one example, the message is sent such that the finding user does not learn the contact information of the owner of the displayed animal. The FR server system may contact the owner by email, by a push notification to the owner's cellular telephone, by a simulated voice call to the user's cellular telephone, or by another mechanism as previously indicated by the owner in the registration process. In another example, if the registered owner has indicated in the registration process that the owner's contact information may be displayed to a finding user, then the owner user's contact information is displayed to the finding user thereby enabling the finding user to contact the owner user directly. Once the finding user and the owner user are in communication with one another, the two users can determine what action to take next.

As indicated above, in some examples the finding user is presented with not just one digital image of the animal that best matches the digital image of the found animal but rather is presented with digital images of several animals that the FR server system determines might be the found animal, and these several digital images are presented to the user in a ranked order in terms of how close the FR server system believes the matches to be. The finding user can then scroll through or flip through the ordered list of potential match images, and if a pictured animal appears to the finding user to be the animal the finding user found, then the finding user may select the button associated with the appropriate pictured animal. Selection of the button confirms that the animal in the digital image of the potential match record is the animal that the finding user found, and that the animals in the other digital images of the other potential match records are more likely not the found animal.

Although an example is described above in which a pet is registered by its owner with the FR system, and then the pet is lost, and then a finding user uses the FR system to reunite the lost pet with its owner, in other usage examples a pet is lost, and then a finding user registers the pet with the FR system as being lost, and thereafter the owner uses the FR system for the first time and locates the lost pet. In this scenario, the finder registers the animal as a lost animal and enters a digital image of the lost animal. The finder may be a previous FR system user at the time the finder found the animal, or the finder may never have previously used the FR system at the time the finder found the lost pet. From the digital image submitted by the finder, the FR system generates a byte string of markers and the byte string is then stored in the database as part of a record. The record includes a flag indicating that the record is for a lost animal. When the owner later seeks to use the FR system, the owner is prompted to go through the registration process. When the owner submits a digital image as part of the registration process and a byte string of facial recognition markers is generated, the FR system performs a compare/search of the byte string for the owner-submitted digital image with byte strings for records having lost animal flags. The FR system then displays to the registering owner digital photographs from likely-match records whose animal lost flags are set. The owner who has lost the animal can then look through the pictures of likely-match lost animals and hopefully identify the lost animal there. Accordingly, a finding user can post a digital image of a lost animal first, and thereafter a previously unregistered owner can register and then be put in touch with the finding user who posted the digital image.

Although examples are described above where computer-implemented facial recognition is used to reunite a lost pet with its owner, the FR system need not employ computer-implemented facial recognition in all embodiments for all purposes. In some embodiments, the FR system determines likely match records using information without the use of automatic computer-implemented facial recognition, and the best likely matches are presented to a user looking for a lost animal in the form of a set of digital images. As in the case of the computer-implemented facial recognition examples described above, each likely match digital image is displayed to the user along with an associated button. The user looking for the lost pet scrolls through these digital images of likely matches. By human visual inspection, the user determines whether the animal in a picture is the lost pet. If the user determines that the animal in a picture is the lost pet, then the user can then select the button associated with the picture. If the user is the animal owner, then the user can use information about the finding user stored in the record to communicate with the finding user. If the user is the finding user, then the user can use information stored in the record about the owner to communicate with the owner user. The FR system website provides a registered user with an ability to enter Boolean equations of multiple database searching parameters, so that the FR system will then evaluate the expression of searching parameters against information stored in the records and will return information from the identified records. The computer-implemented facial recognition is but one mechanism for searching through the records of the database.

Utilizing GPS technology in conjunction with facial recognition markers is unique to the FR system. The combination creates an identification system with peerless accuracy in identifying lost/found pets. GPS tethering to an animal's location via its owner's mobile phone when away and to its main address when home makes the FR system significantly more effective in quickly locating lost pets regardless of whether the pet and owner are on vacation, or at the park, or at home. Whereas there are several unique challenges to animal image identification, the FR system involves a multi-layer image processing program that ensures that the most accurate facial mapping occurs regardless of camera angle or lighting conditions. To account for photos taken of a stray animal, a loose pet or a pet that simply will not cooperate with putting its face in the perfect depth and centered position for taking a digital photograph of the animal, a first layer of the FR image processing system shears, rotates, shifts and renders the inputted photo to align the eyes and nose to the correct axis and depth for carrying out facial recognition. Fur color, markings and color patterns are unique to animal image recognition. However, lighting conditions can result in an animal's coloration looking dramatically different from image to image. To eliminate this disparity, a second layer of the FR image processing system identifies lighting type, saturation, hue and balance in each inputted photo and then re-colorizes each image to have same lighting type. The reprocessed images that have been processed through the first and second layers are then used for facial recognition mapping. In each record, in addition to one such preprocessed image, there is a low resolution version of the image that is also stored in association with the facial algorithm keys for future image comparison purposes.

Figure 5:
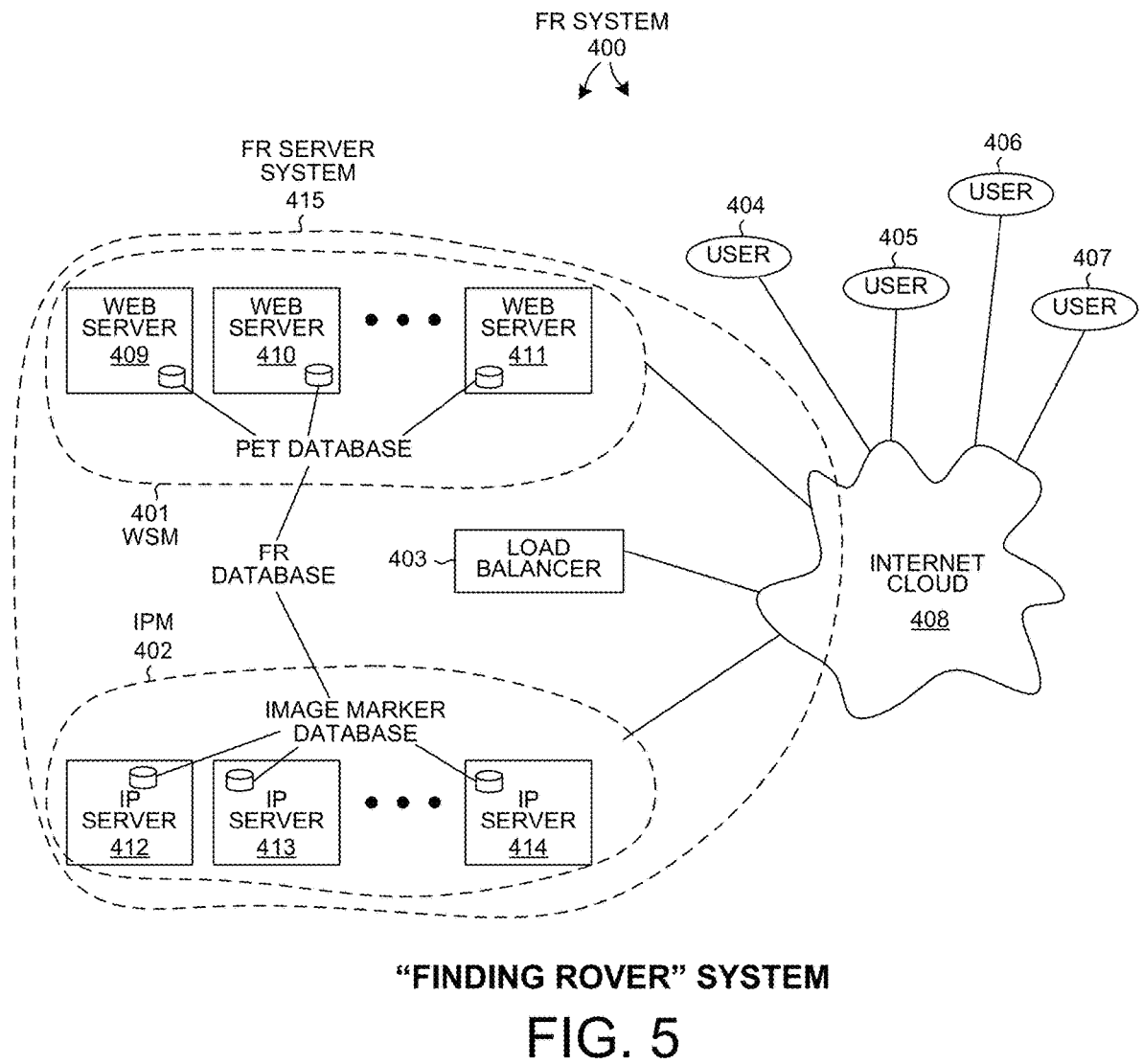
FIG. 5 is a diagram of an embodiment of the FR system.

FIG. 5 is a diagram of one embodiment of the FR system 400. FR system 400 includes the FR server system 415 and the web-enabled devices of users 404-407. FR server system 415 in turn includes a web service mechanism (WSM) 401, an image processing server mechanism (IPM) 402, and a load balancer 403. A copy of a pet database is stored on each web server, and the copies of the pet database are synchronized. In addition, a copy of an image marker database is stored on each IP server, and the copies of the image marker database are also synchronized. The pet database and the image marker database are referred to together here as the "FR database".

WSM 401 serves the FR website web pages and web data to the web-enabled devices of users 404-407 and provides interactive communication capabilities with the users 404-407 via networks 408. Networks 408 are represented in the diagram by the internet cloud. A user can communicate with and interact with WSM 401 using any internet connected device that has a suitable web browser. A user can use a web-enabled wireless mobile communication device such as a cellular telephone, or a hardwired landline connected desktop computer having a web browser.

In one implementation, WSM 401 actually includes a plurality of distributed cloud-based web servers 409-411. IPM 402 does not interact directly with users, but rather performs directed sub-functions for WSM 401. Communication between WSM 401 and IPM 402 is via TCP/IP data communications across the internet 408. In one implementation, IPM 402 actually includes a plurality of distributed cloud-based servers 412-414. The load balancer 403 balances requests coming in from the users 404-407 to selected ones of the web servers 409-411. The load balancer 403 also directs function requests from the web servers 409-411 of WSM 401 to selected ones of the IP servers 412-414 of IPM 402 so that the computational loads from the requesting WSM 401 are distributed across the various servers 412-414 of IPM 402.

Each of the web servers 409-411 is, in one example, an Intel-based server running a Microsoft Windows OS, upon which an IIS (Internet Information Services) web server application software runs in a Microsoft.NET framework. Each of the IP servers 412-114 is, in one example, an Intel-based server running a Microsoft Windows OS, upon which MySQL database software runs in a Microsoft.NET framework. The load balancer is, in one example, a F5 load balancer. Although an example is set forth here in which FR server system 415 includes WSM 401, IPM 402, and load balancer 403, in other examples both the web server and the IP server functionality is performed by a same single server.

In carrying out a first function, IPM 402 receives a digital image from a web server of WSM 401 via the internet 408 and converts the digital image into a byte string of facial recognition markers as described above. The IPM 402 then stores the byte string in an associated record in the image marker database. The record is identified by a unique ID. In carrying out a second function, IPM 402 receives a digital image of a found animal and a plurality of IDs from a web server of WSM 401 via the internet 408, where the IDs identify records in the image marker database to be searched. IPM 402 compares/searches the byte strings of the records identified by the IDs for the best match to the image of the found animal, and returns to the requesting web server of the WSM 401 an ordered list of likely match IDs. In one embodiment, both WSM 401 and IPM 402 store, or have access to, a mirrored copy of the entire FR database of records. Each record in the FR database is identified by its corresponding ID.

Figure 6A:
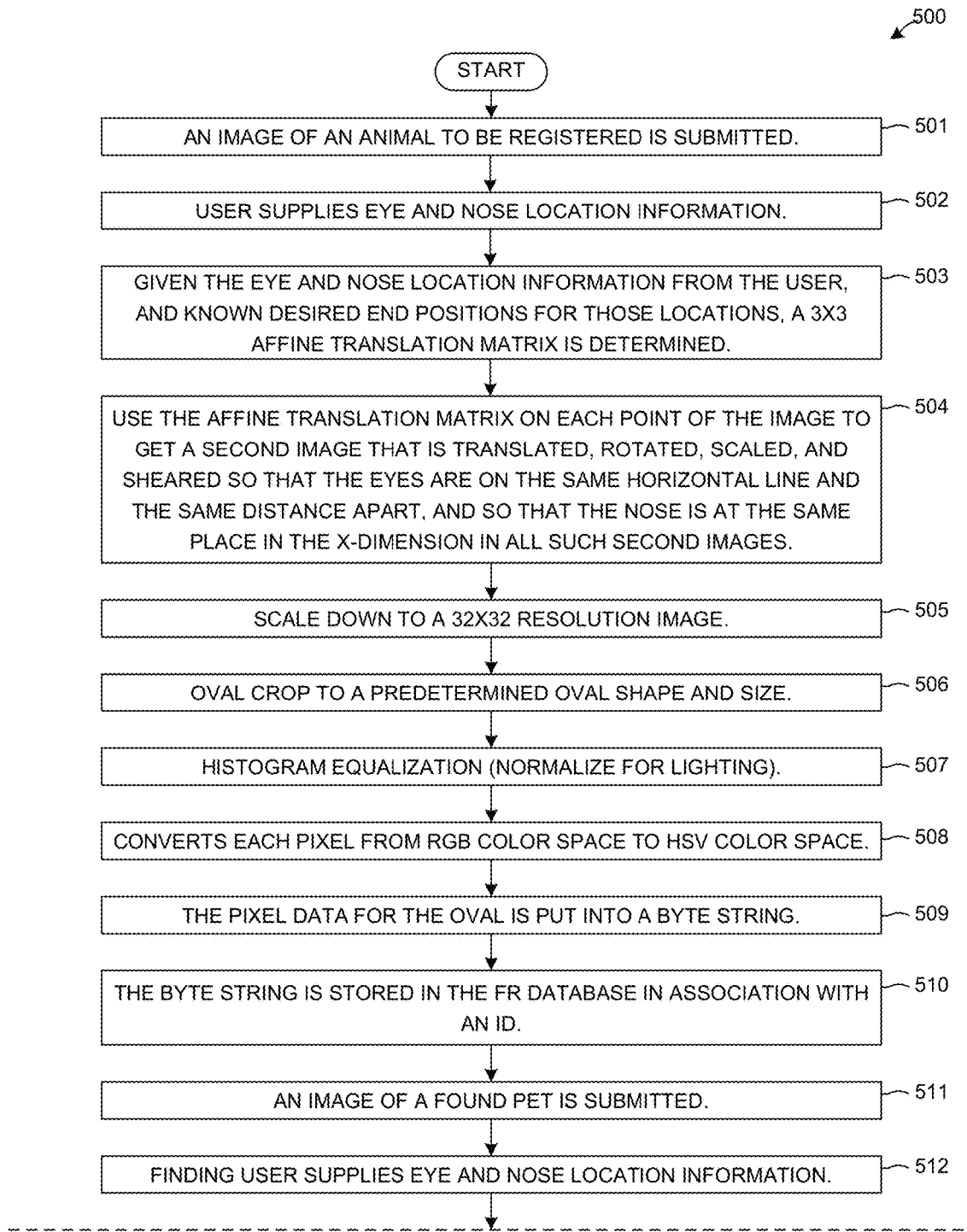
FIG. 6A is a flowchart showing steps 501-512 of a method 500 involving the FR system in accordance with one novel aspect.
Figure 6B:
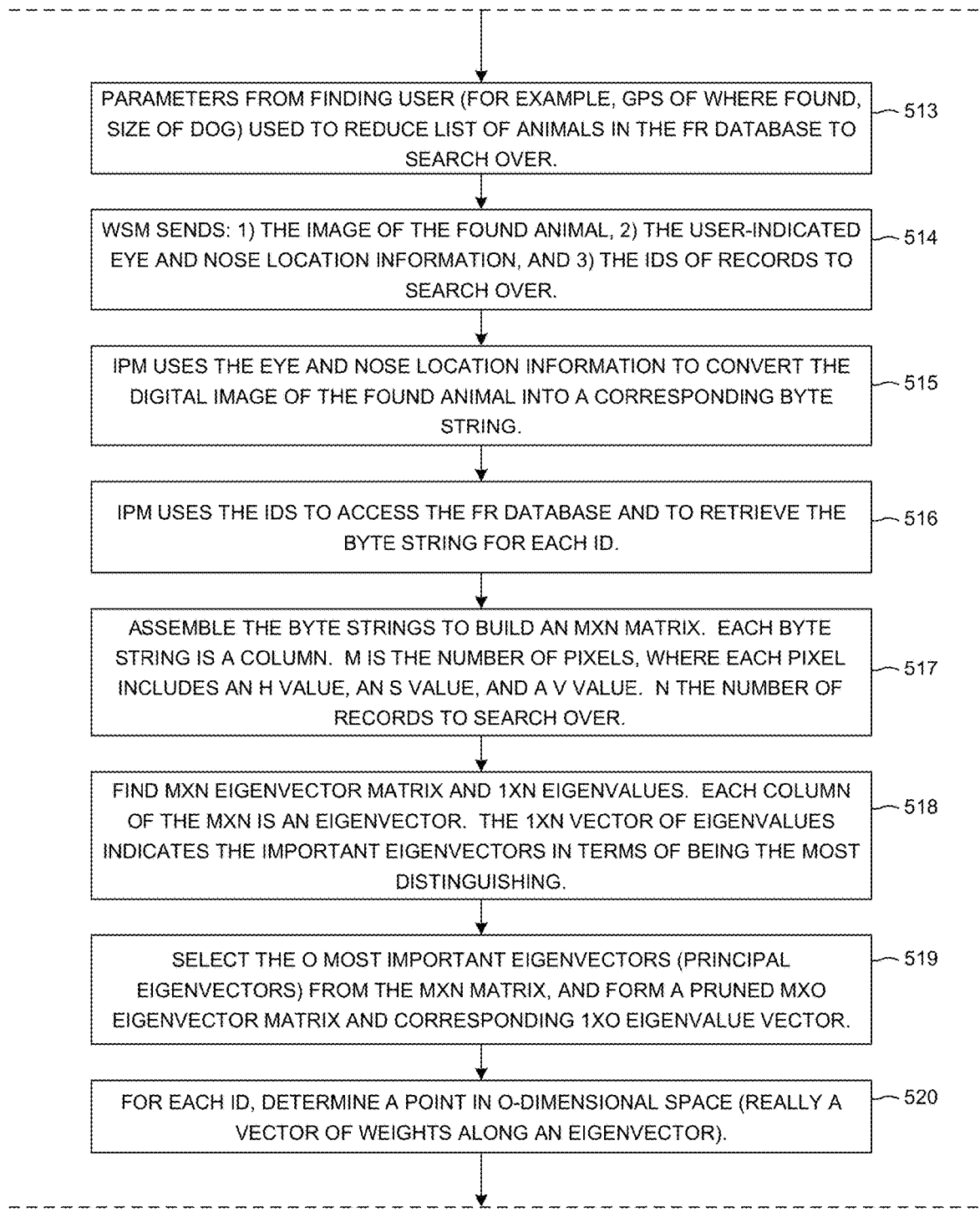
FIG. 6B is a flowchart showing steps 513-520 of a method 500 involving the FR system in accordance with one novel aspect.
Figure 6C:
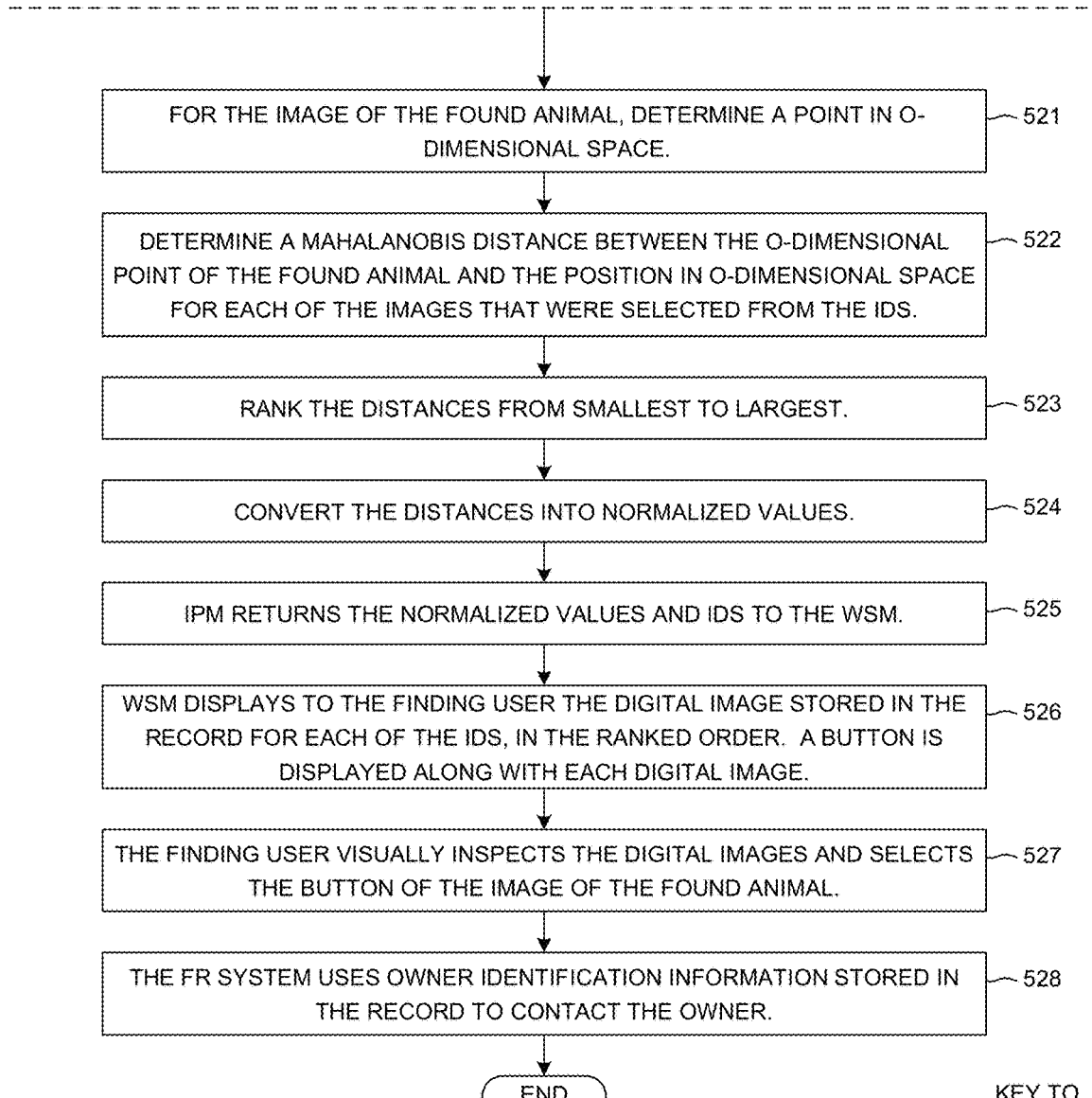
FIG. 6C is a flowchart showing steps 521-528 of a method 500 involving the FR system in accordance with one novel aspect.

FIG. 6 is a flowchart that illustrates an exemplary operational flow through a method 500 carried out by FR system 400. FIGS. 6A, 6B, and 6C together form complete FIG. 6. When an image is submitted (step 501) to the FR system, whether the image is being submitted as part of the registration process or is being submitted as a picture of a found animal, the user submitting the image is requested by WSM 401 to indicate where the eyes are located in the image and where nose is located. In one example, an instruction to place the user's screen cursor on the left eye is displayed to the user and then an instruction to press enter or to press a button on the user's mouse is displayed. The user complies and presses enter or the button. In this way a user who owns an animal supplies (step 502) user-indicated left eye location information to WSM 401. WSM 401 serves the web pages or web data that lead the user through the registration process. Likewise, instructions are displayed to the user to put the cursor on the right eye of the animal and then to press enter or to press on a button on the user's mouse. Likewise, instructions are displayed to the user to put the cursor on the nose of the animal and then to press enter or to press on a button on the user's mouse. The user therefore supplies user-indicated left eye location information, user-indicated right eye location information, and user-indicated nose location information to WSM 401.

The digital image of the animal to be registered, along with user-indicated left eye location information, user-indicated right eye location information and user-indicated nose location information is communicated from WSM 401 to IPM 402. Given the left and right eye locations and the nose location given by the user, and given desired end positions for those locations in a transformed image, IPM 402 determines a 3×3 affine transformation matrix (step 503). IPM 402 uses the determined 3×3 affine transform matrix to translate, rotate, shear, and scale (step 504) the originally submitted digital image so that the nose in the transformed image is centered in the horizontal axis, and so that the eyes in the transformed image are disposed on the same horizontal line, and so that the distance between the eyes in the transformed image is a predetermined distance. The resulting transformed image is then scaled down (step 505) to be a 32×32 pixel image. In one novel aspect, the 32×32 pixel image is then cropped to have an elliptical oval shape (step 506) where the resulting oval-cropped image contains pixels for the eyes and nose. In one example, the width-to-height ratio of the elliptical oval shape is 3/2.5. Histogram equalization is then performed (step 507) to normalize for the original digital images being taken under different lighting conditions. The equalized elliptical oval image is then converted from the RGB color space into the HSV (hue, saturation, value) color space (step 508). Each pixel is represented by three values: one H value, one S value, and one V values. The pixel values of the various rows of pixels making up the elliptical oval image are then put into a linear sequence (step 509). The linear sequence is referred to here as a "byte string". In one example, for any digital image of an animal submitted, the byte string created has the same number of bytes. A digital identifier (ID) is assigned to the byte string for identification purposes, and the byte string is stored (step 510) in a record in the FR database under the ID. All other information collected about the animal and about the owner is also stored in the record, including, for example: 1) the original digital image of the animal to be registered, 2) the breed, color, sex, age, weight, and distinctive markings of the animal to be registered, 3) contact information for the owner, 4) geographical location information indicating the residence of the animal to be registered, 5) veterinarian identification and contact information, 6) veterinarian information including notice scheduling information.

In the specific example of FIG. 6, another user then finds the animal. The finding user uses the FR mobile app executing on his/her wireless communication device to access the WSM-served web services. The finding user is prompted by WSM-served screens to go through the same image submission process as in the registration example described above. The finding user is prompted to take a digital image (step 511) of the found animal, and then is prompted to identify (step 512) the left eye location, the right eye location, and the nose location on the image. WSM 401 has access to a copy of the FR database. WSM 401 uses parameters received from the finding user to reduce the list of records in the FR database to search over. In one example, Global Positioning System (GPS) geographical location information from the finding user's wireless communication device indicates where the animal was found. This geographical location information is received from the finding user and is used by WSM 401 to identify in the FR database those records (step 513) where the animal's residence is within a certain predetermined distance of the geographical location where the animal was found. In some embodiments, other animal identifying information from the finding user is also used to limit the number of records to be searched. WSM 401 then supplies IPM 402 the IDs of this limited number of records, along with the digital image of the found animal, and along with the user-indicated eye and nose location information for the image of the found animal (step 514). IPM 402 uses the user-indicated eye and nose location information to process and to convert the digital image of the found animal into a corresponding byte string (step 515) by the same process described above.

IPM 402 uses the IDs supplied by WSM 401 to access the associated records in the FR database and to retrieve the byte string for each ID (step 516). The retrieved byte strings are assembled to form an M×N matrix (step 517), where each M value column is one byte string. In the present example WSM 401 supplied N IDs to search over, so there are N byte strings, and so there are N columns in the matrix. Each of the M×N values includes one HSV triplet of values.

Next, IPM 402 performs a singular value decomposition on the M×N matrix, thereby generating an M×N matrix of eigenvectors and one 1×N eigenvalue vector (step 518). Each M value column of the M×N eigenvector matrix is one eigenvector. There are N eigenvectors. Each of the N values of the 1×N eigenvalue vector is one eigenvalue. The eigenvalues indicate the spatially important eigenvectors in the matrix.

Next, IPM 402 selects the O most important eigenvectors from the M×N eigenvector matrix, thereby forming a pruned M×O matrix (step 519). The value O in one representative example is twelve. Similarly, a corresponding 1×O eigenvalue vector is formed. Then, for each of the N IDs, a point in O-dimensional space is determined (step 520). The point in O-dimensional space is determined by multiplying the M×O matrix by the original byte string identified by an ID. This is done for each of the IDs, thereby generating a point in O-dimensional space for each of the N IDs. Likewise, a position in O-dimensional space is determined for the byte string of the image of the found animal (step 521). To do this, the M×O matrix is multiplied by the byte string of the image of the found animal.

Next, IPM 402 determines a Mahalanobis distance (step 522) between the position in O-dimensional space for the image of the found animal and the position in O-dimensional space for each of the N images that were selected from the IDs. The resulting N Mahalanobis distances are then ranked from smallest to largest (step 523). For each distance in the ranking, the associated ID is listed. The N distances and the N corresponding IDs may, for example, form a two column table, where the uppermost row corresponds to the smallest distance, where the next uppermost row corresponds to the next smallest distance, and so forth.

Next, IPM 402 converts the N distances into N normalized values (step 524). In one example, each distance is converted in a non-linear mapping into a percentage in a range of from zero percent to one hundred percent. The percentage value in a row indicates the likelihood that the image associated with the ID of the row is a match for the image of the found animal. IPM 402 returns to WSM 401 the normalized values and their associated IDs (step 525).

IPM 402 has therefore performed a function for WSM 401. WSM 401 supplied a function request to search records identified by IDs supplied by the WSM 401 and to indicate the best matches to a digital image supplied by WSM 401, using eye and nose location information also supplied by WSM 401. IPM 402 performed the function, and returned an ordered list of the IDs, where for each ID a percentage likelihood of the match being correct was supplied.

Next, by serving web data to the FR mobile application executing on the finding user's mobile communication device, WSM 401 displays to the finding user the digital image stored in the record for the highest percentage likelihood value along with a confirmation button, and then displays the digital image stored in the record for the next highest percentage likelihood value along with a confirmation button, and then displays the digital image stored in the record for the third highest percentage likelihood value along with a confirmation button, and so forth (step 526). The digital images displayed may be the low-resolution images stored in each record in the database. Next, the finding user visually inspects (step 527) the displayed images and selects the button for the image of the animal that the finding user found. As described above, the finding user's selection of the button may serve both as: 1) a confirmation that the animal of the digital image of the identified record is the same animal that the finding user found, and 2) an instruction to the RF system to initiate contact with the owner of the pictured animal. Next, in the example of FIG. 6, the FR system responds to the button selection by contacting the owner (step 528) using owner identification information stored in the matching record.

In one novel aspect, information in the FR database about an individual dog that was put into the FR database for lost pet locating purposes is thereafter used by the FR system to provide the registered dog owner with information particularly pertinent to the pet. For example, an owner of a registered pet can, in entering a retail store (for example, a pet store), use the mobile app on the owner's cellular telephone to indicate a desire to receive coupons or other information specific to the store. The FR system at this point knows, by virtue of receiving GPS information from the user's cellular telephone, that the user is physically present in the retail store. The FR system also knows information about the pet such as its breed and size and likely particular needs. The FR system therefore supplies to the owner, via the owner's cellular telephone, coupons usable at the particular store and for products that the owner is likely interested in due to the products being pertinent to owner's particular pet. The FR system may provide such electronic coupons usable in the particular retail store, or the FR system may provide information about sale prices or products available for purchase in the store. The owner may indicate a desire to receive such targeted coupons and information without being bothered with unsolicited contact, but virtue of the owner using the mobile app and cellular telephone to register a desire to receive coupons and information at the time the owner enters the store using the owner's cellular telephone.

In one novel aspect, veterinarians are enlisted and incentivized to register pets passing through their offices with the FR system. Veterinarians may find it onerous and/or expensive to send reminders and notices to pet owners. Reminders and notices may include reminders to bring a pet into the veterinarian's office to receive vaccinations, or to receive medications, or to receive other scheduled treatments and services. Reminders and notices may include reminders to a pet owner to give the pet certain medications. Reminders and notices may include advertisements for purchasing medications and other items and services at discount rates. In return for a veterinarian registering pets with the FR system, the FR system is made configurable by the veterinarian so that the FR system will thereafter automatically send out scheduled electronic notices for each registered pet to the owner. The veterinarian can specify, through a special veterinarian's portal having security features, what the notices will say and when the notices will be sent out.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a first image, wherein a first animal appears in the first image;
   (b) receiving a first geographical location indicator, wherein the first geographical location indicator does not indicate the location where the first image was captured;
   (c) transmitting a second image, wherein a second animal that has a similar appearance to the first animal appears in the second image; and
   (d) transmitting a contact information associated with the second animal, wherein the transmitting of (c) and (d) are performed in response to determining that the second animal has a similar appearance to the first animal, wherein the determining is performed by one or more devices including a processor, a memory and a communication port, and wherein the determining that the second animal has a similar appearance to the first animal is only performed when the first geographical location indicator indicates a first location that is within a distance from a second location that is indicated by a second geographical location indicator associated with the second image.

2. The method of claim 1, further comprising:
   (e) transmitting the second geographical location indicator that indicates where the second animal is located.

3. The method of claim 1, further comprising:
   (e) transmitting a third image, wherein the first animal does not appear in the third image, and wherein the second animal does not appear in the third image.

4. The method of claim 3, further comprising:
   (f) transmitting a contact information associated with the third image.

5. The method of claim 3, wherein the one or more devices include a server.

6. The method of claim 1, wherein the first geographical location indicator indicates a location where a search for animals with a similar appearance is to be performed.

7. The method of claim 1, wherein the contact information includes an email address, a phone number, or a physical location.

8. The method of claim 1, further comprising:
   (e) prompting an user to communicate using the contact information.

9. The method of claim 1, further comprising:
   (f) prompting the user to indicate that user would like to acquire the second animal.

10. The method of claim 1, wherein the distance is selectable by a user.

11. The method of claim 1, wherein the first geographical location indicator includes the distance.

12. The method of claim 1, wherein the first geographical location indicator includes latitude and longitude information.

13. The method of claim 1, wherein the second geographical location indicator includes latitude and longitude information.

14. The method of claim 1, wherein the first geographical location indicator includes a street address.

15. The method of claim 1, wherein the second geographical location indicator includes a street address.

16. The method of claim 1, wherein the first geographical location indicator includes a zip code.

17. The method of claim 1, wherein the second geographical location indicator includes a zip code.

18. The method of claim 1, wherein the first geographical location indicator indicates where a user is located.

19. The method of claim 1, wherein the second geographical location indicator indicates where the second animal is located.

20. The method of claim 1, wherein the second geographical location indicator indicates where a person or organization in possession of the second animal is located.

* * * * *